US011233565B2

(12) United States Patent
Lundberg et al.

(10) Patent No.: US 11,233,565 B2
(45) Date of Patent: *Jan. 25, 2022

(54) QUANTUM DETECTION AND TRACKING OF PULSED OPTICAL SIGNALS

(71) Applicant: Leidos, Inc., Reston, VA (US)

(72) Inventors: James Charles Lundberg, Snohomish, WA (US); Christopher Hochuli Fisher, Kirkland, WA (US); Mark Edwin Krepel, Mukilteo, WA (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,061

(22) Filed: Oct. 6, 2020

(65) Prior Publication Data

US 2021/0021339 A1 Jan. 21, 2021

Related U.S. Application Data

(63) Continuation of application No. 16/539,814, filed on Aug. 13, 2019, now Pat. No. 10,826,606.
(Continued)

(51) Int. Cl.
*H04B 10/079* (2013.01)
*H04B 10/70* (2013.01)

(52) U.S. Cl.
CPC ....... *H04B 10/07953* (2013.01); *H04B 10/70* (2013.01)

(58) Field of Classification Search
CPC .......................... H04B 10/07953; H04B 10/70
(Continued)

(56) References Cited

U.S. PATENT DOCUMENTS

| 4,995,101 A | 2/1991 | Titterton et al. |
| 6,734,415 B1 * | 5/2004 | Staton ............. G01J 1/4228 250/208.1 |

(Continued)

FOREIGN PATENT DOCUMENTS

WO  WO 2016/164146  10/2016

OTHER PUBLICATIONS

V. A. Vilnrotter, E. R. Rodemich, and H. H. Tan, "A Synchronization Technique for Optical PPM Signals," The Telecommunications and Data Acquisition Progress Report 42-87, Jul.-Sep. 1986, Jet Propulsion Laboratory, Pasadena, California, pp. 24-31, Nov. 15, 1986, http://tmo.jpl.nasa.gov/tmo/progress report/42-87/87C.PDF.

(Continued)

*Primary Examiner* — Dalzid E Singh
(74) *Attorney, Agent, or Firm* — Dawn-Marie Bey; Bey & Cotropia PLLC

(57) ABSTRACT

Apparatus for detecting pulse optical position modulated signals with high background noise by detection of quantum arrival rate at the detector are described. Pulse signals at the detection limit are characterized by the arrival of clusters of individual photons at an optical receiver. The receiver has embedded shot noise that interferes with the detection of the signal of interest. The apparatus distinguishes the signal of interest by a measurement of the rate of arrival of the photons of the signal of interest from the ambient shot noise rate of the receiver. The apparatus determines the optimal signal detection criteria and calculates the expected bit error rate of the decoded data.

20 Claims, 14 Drawing Sheets
(8 of 14 Drawing Sheet(s) Filed in Color)

Related U.S. Application Data

(60) Provisional application No. 62/718,714, filed on Aug. 14, 2018.

(58) Field of Classification Search
USPC .......................................................... 398/26
See application file for complete search history.

(56) References Cited

U.S. PATENT DOCUMENTS

| | | | |
|---|---|---|---|
| 7,203,425 | B1 | 4/2007 | Keller et al. |
| 7,653,108 | B2 | 1/2010 | Morris et al. |
| 8,081,882 | B2 | 12/2011 | Tuchler |
| 8,755,687 | B2* | 6/2014 | Dynes ................... H04L 9/0852 398/40 |
| 9,490,910 | B2 | 11/2016 | Lacovara |
| 2002/0131121 | A1 | 9/2002 | Jeganathan et al. |
| 2006/0243909 | A1* | 11/2006 | Gerwin ..................... G01J 1/04 250/336.1 |
| 2012/0057508 | A1 | 3/2012 | Moshfeghi |
| 2013/0246077 | A1 | 9/2013 | Riedmiller et al. |
| 2014/0212142 | A1 | 7/2014 | Doniec et al. |
| 2014/0241309 | A1 | 8/2014 | Hilton et al. |
| 2015/0171961 | A1 | 6/2015 | Featherston et al. |
| 2016/0050030 | A1 | 2/2016 | Riedl et al. |
| 2016/0121009 | A1 | 5/2016 | Farr et al. |
| 2016/0236760 | A1 | 8/2016 | Siesjo et al. |
| 2018/0149476 | A1* | 5/2018 | Huang ................... G01S 17/06 |
| 2019/0025440 | A1* | 1/2019 | Steadman Booker ...................... H04N 5/3456 |
| 2019/0064223 | A1* | 2/2019 | Kincaid ............... G01R 13/029 |
| 2019/0305853 | A1* | 10/2019 | Dolgin ................. H04B 10/071 |

OTHER PUBLICATIONS

Srinivasan, M., Vilnrotter, V., and Lee, C., "Decision-Directed Slot Synchronization for Pulse-Position-Modulated Optical Signals," The Interplanetary Network Progress Report 41-161, Jet Propulsion Laboratory, Pasadena, California, May 15, 2005, http://ipnpr.jpl.nasa.gov/progress report/42-161/161R.pdf.

H. Kaushal and G. Kaddoum, "Underwater Optical Wireless Communication," IEEE Access, vol. 4, pp. 1518-1547, 2016.

M. O'Rourke, et al., "Multi-Modal Communications in Underwater Sensor Networks Using Depth Adjustment," WUWNet '12, Los Angeles, CA, Nov. 5-6, 2012, 5 pp.

S. Han, et al., "Evaluation of Underwater Optical-Acoustic Hybrid Network," China Communications, pp. 49-59, May 2014.

N. Farr, et al., "An Integrated, Underwater Optical / Acoustic Communications System," IEEE Xplore, Conference Paper, DOI: 10.1109/OCEANSSYD.2010.5603510, Jun. 2010.

H. Kulhandjian, et al., "Towards Experimental Evaluation of Software-Defined Underwater Networked Systems," Department of Electrical Engineering, State University of New York at Buffalo, and Teledyne Benthos, 2012, 9 pp.

"Scientific and Technical Reports—Preparation, Presentation, and Preservation," ANSI/NISO Z39.18-2005 (R2010), ISSN: 1041-5653, Published by the National Information Standards Organization, Baltimore, MD, 93 pp., Copyright 2010.

International Search Report and Written Opinion for PCT Application No. PCT/US17/20932, dated Jul. 7, 2017, 12 pp.

Joshua Rapp and Vivek K. Goyal, "A Few Photons Among Many: Unmixing Signal and Noise For Photon-Efficient Active Imaging," arXiv: 1609:07407v1, 13 pp., Sep. 23, 2016.

\* cited by examiner

QUANTUM DETECTION AND TRACKING OF PULSED OPTICAL SIGNALS

CROSS-REFERENCE TO RELATED APPLICATIONS

The present application is a continuation of U.S. application Ser. No. 16/539,814, titled "Quantum Detection and Tracking of Pulsed Optical Signals," filed Aug. 13, 2019, which claims benefit of priority to U.S. Provisional Patent Application No. 62/718,714, titled "Quantum Detection and Tracking of Pulsed Optical Signals," filed Aug. 14, 2018, both of which are incorporated herein by reference in their entireties.

BACKGROUND

Field of the Invention

The present embodiments are generally directed to a device and method for/of detection and tracking of low energy pulsed signal sources. More particularly, the present methods apply to communication applications where the detected signal can be characterized by a measurement of the arrival of individual quantum at the detector and needs to be filtered from background quantum events.

Description of Related Art

Prior optical detectors treat the signal as a continuous variable signal and typically attempt to use a matched filtering to remove the shot noise from the signal. In doing this they remove some of the actual signal content and reduce the total sensitivity of the receiver. They also remove the information of the signal and noise that allows the receiving system to directly predict the probability of the signal detection and the estimation of the bit error rate of the signal that has been recovered. This is valuable information that can be used to aid the acquisition of communication at degraded operating conditions.

SUMMARY OF THE EMBODIMENTS

The embodiments herein include systems and processes for filtering low energy optical signals by continuous characterization of shot noise measurements and signal quantum event rates. The ability to perform this filtering further facilitates dynamic optimization of the optical signal detection threshold in high noise and low signal level conditions, dynamic assessment of communication channel bit error rate based on measurement of channel shot noise rates and signal quantum event rates, as well as the design of a high sensitivity PPM signal receiver based on detection of signal quantum rates and shot noise rates.

In an exemplary first embodiment, a process for identifying a signal at a detector by filtering received signal pulses from shot noise at a receiver of the detector, includes determining an expected signal pulse repetition time frame; determining a window that is equivalent to an expected signal pulse length, wherein the window is shorter than the expected signal pulse repetition time frame and multiple windows fit within the expected signal pulse repetition time frame; measuring total number of quanta events received at the receiver during the expected pulse repetition time frame and a number of quanta events within each of the multiple windows; determining a peak window count (PWC) which is a highest number of quanta events in any single one of the multiple windows; calculating an average rate of quanta events due to noise; and calculating the number of quanta events from the received signal pulse to identify the signal.

In an exemplary second embodiment, a quantum detector for signal detection, includes: an optical detector for receiving and detecting individual quanta events; a first counter for counting all individual quanta events received ($NC_{meas}$) during a predetermined time frame; a second counter for counting individual quanta events occurring within instances of a predetermined window of time, wherein the predetermined time frame includes multiple instances of the predetermined window of time; a processor implementing code for identifying a peak window count, wherein the peak window count is determined from the multiple instances having the highest individual quanta events and further wherein the peak window count approximates a signal count ($SIG_{meas}$) for a received signal; a processor implementing code for meas, using ($NC_{meas}$) and ($SIG_{meas}$) to calculate a threshold quanta event value, Th, that minimizes the received signal's bit error rate (BER); a processor implementing code for comparing each predetermined window of time's individual quanta count from the second counter with Th, wherein for counts exceeding Th, an arrival time is recorded, wherein at least BER and arrival time are used to decode the signal.

In a third exemplary embodiment, a process for dynamic optimization of optical signal detection, includes: receiving and detecting individual quanta events at an optical detector; counting by a first counter all individual quanta events received ($NC_{meas}$) during a predetermined time frame; counting by a second counter individual quanta events occurring within instances of a predetermined window of time, wherein the predetermined time frame includes multiple instances of the predetermined window of time; identifying by code implemented on a processor a peak window count, wherein the peak window count is determined from the multiple instances having the highest individual quanta events and further wherein the peak window count approximates a signal count ($SIG_{meas}$) for a received signal; calculating by code implemented on a processor using ($NC_{meas}$) and ($SIG_{meas}$) a threshold quanta event value, Th, that minimizes the received signal's bit error rate (BER); comparing by code implemented on a processor each predetermined window of time's individual quanta count from the second counter with Th, and for counts exceeding Th, recording an arrival time; and decoding by a signal decoder received optical signals using at least BER and arrival time.

BRIEF DESCRIPTION OF FIGURES

The patent or application file contains at least one drawing executed in color. Copies of this patent or patent application publication with color drawing(s) will be provided by the Office upon request and payment of the necessary fee. The invention will be described with respect to specific embodiments thereof, and reference will be made to the drawings, in which.

DETAILED DESCRIPTION

List of Symbols, Abbreviations and Acronyms

| | |
|---|---|
| BER | Bit Error Rate |
| FH | False High |
| FL | False Low |
| M | Mean Rate |
| PBFH | Probability of False High |
| PBFL | Probability of False Low |
| PMT | Photo Multiplier Tube |
| PPM (upper case) | Pulse Position Modulation |
| PPM# | With a number it refers to the number bits per symbol, PPM3 means 3 data bits per symbol and would have 8 time slots per data period. |
| SNR | Signal to Noise Ratio |

Definitions of Certain Terms

Figure 1:
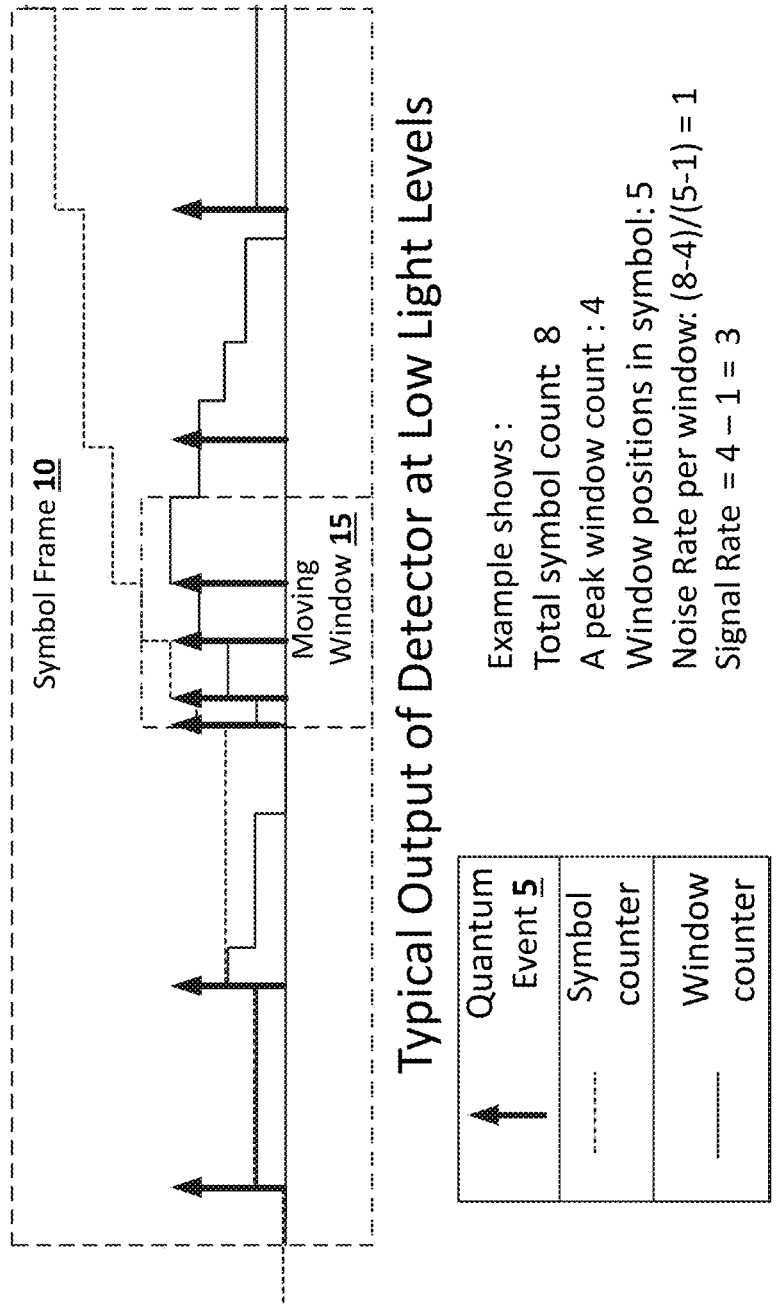
FIG. 1 is an exemplary symbol frame output from an exemplary optical detector at low light levels.

| | | |
|---|---|---|
| Quantum Event | Detection of a photon arrival or of a change of a quantum state of a lepton. A quantum event detection can be generated by noise or by the signal of interest | Individual photon to electron conversion at a light detector, such as a PMT |
| Signal (SIG) | The signal is a cluster in time of quantum events related to detection of a transmission from a source | FIG. 1 shows a cluster of quantum events in the middle of the frame. The higher rate of quantum events is because this sample includes the photons from the remote transmitter |
| Noise Rate (NR) | A measured rate of quantum events that is observed in the detection system when no signal is present | FIG. 1 shows a random occurrence of quantum events during the symbol that are not related to signal |
| Symbol (S) | PPM construct for encoding information. It include the full time of all the time slots and the dead time needed by physical layer device to recharge to send another pulse | Symbol time = slot time * 2^PPM# + recharge time |
| Symbol Count (SC) | Quantum events detected during a symbol time | FIG. 1 shows 8 quantum events over a symbol period |
| Symbol Frame (SF) | The symbol and the symbol frame are similar, they both are the total time period that a PPM signal is encoded. The difference is the symbol is the abstracted construct and the symbol frame is the actual period used by the detector. | FIG. 1 shows a symbol frame period that is evaluated for the arrival of a pulse. |
| Time Slot (TS) | Basic time division of the PPM encoding method. The shortest limit of the time slot is the expected temporal dispersion of the signal in the transport media. | Fixed period of time configured by link layer electronics. Current range is 6 ns to 1280 ns. |
| Window (W) | The window time is used by the receiver to detect a signal in the data stream. In an practical system the window time can be shorter than the time slot to support better signal detection when temporal dispersion in the media is low. | For the example in FIG. 1 the window time is equal to the time slot time. |
| Window per Symbol (WPS) | The count of window times in each symbol time. WPS = W/S | For the example in FIG. 1, there are 5 windows per symbol |
| Peak Window Count (PWC) | This is a counting device in the receiver that calculates at each clock cycle the number quantum events that occur over the past window time. As the time progresses through the symbol, the peak value of this counter is recorded. | For the example in FIG. 1, the window count is shown as the solid line. The peak value occurs when the signal is present and includes the signal quantum events and the noise quantum events |

The embodiments include a device, such as an optical detector, that recovers low energy pulsed optical signals and provides an indication of the pulse arrival time to the receiver. The embodiments are expected to have two main advantages over prior art optical receivers. The embodiments are expected to improve the overall sensitivity of detection of a signal. The embodiments also support direct calculation of the probability of signal recovery and estimate of bit error rate ("BER"). This real time probability assessment of the received signal allows the receiver to distinguish the likelihood of the presence of the transmitted signal from background noise during the link acquisition phase of an optical communications system and process and can be used to adjust the receiver operation by an adjustment of gain or by alignment to improve the performance of the optical communication link to secure the link acquisition.

For exemplary discussions related to the embodiments herein, FIG. 1 shows an example of a typical output of an optical detector, at low light levels. A key advance of the detection method described in the embodiments herein is the identification that at low signal levels the optical detection becomes discontinuous, i.e., it becomes the detection of individual quantum events at the detector. Similarly, noise at the detector is also characterized by shot noise, or detection of individual quantum events. The primary distinction between the noise and the signal is the average arrival rate of the quanta events 5. The present embodiments measure the quanta events 5 over the expected pulse repetition time, e.g., symbol frame 10, to determine the total count of events.

In the example of FIG. 1, the total symbol count is 8 because 8 quantum events occurred during the symbol frame period. The embodiments also record the peak window event count during a moving window 15 that is as long as the expected pulse duration. In the exemplary embodiment of FIG. 1, there are 5 window positions within the symbol frame 10 and the window position with the highest, i.e., peak, event count is the one shown which contains 4 events. From these two counts, the average rate of quantum event due to noise and the number of quantum events from the signal can be calculated.

SC=NR*WPS+SIG

PWC=NR+SIG

These two equations are used to solve for the information of interest:

NR=(SC−PWC)/(WPS−1)

SIG=PWC−NR

Figure 2:
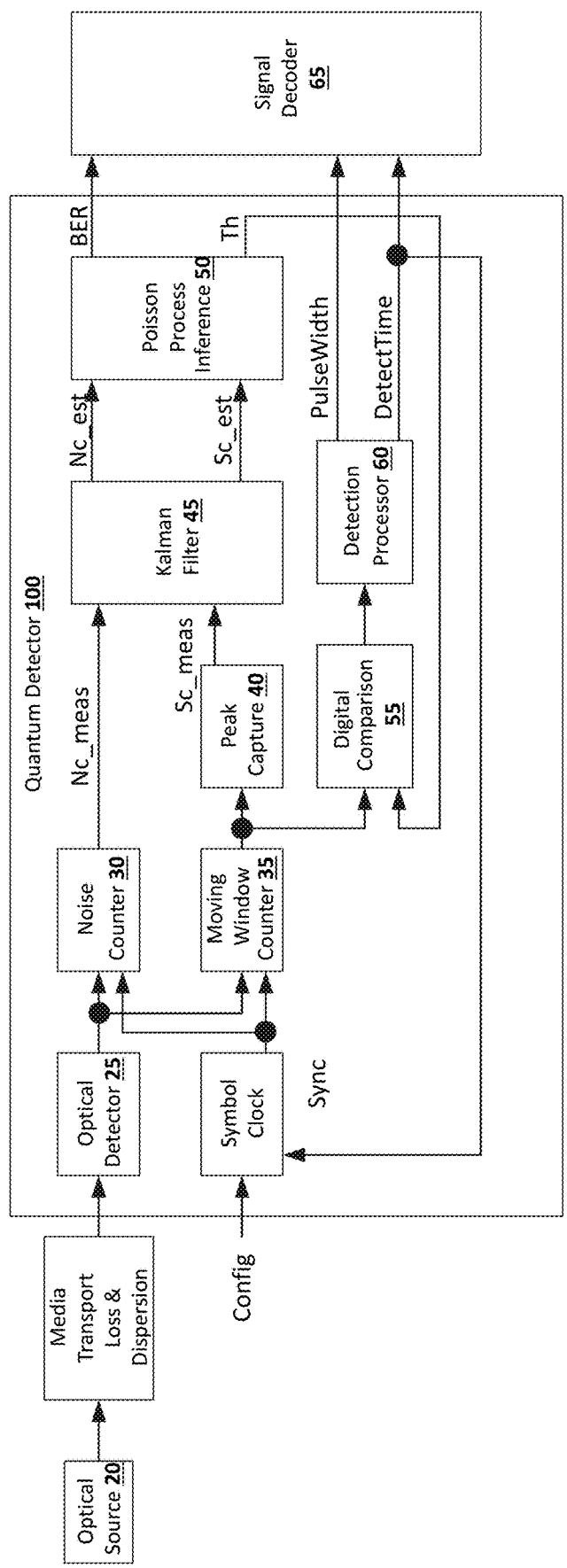
FIG. 2 illustrates an exemplary system configuration including quantum detector in accordance with an embodiment herein.

Referring to FIG. 2, an optical signal is encoded at optical source 20 and is subject to media transport loss and dispersion before arrival at optical detector 25 of the quantum detector 100. The result of signal transport loss and dispersion is a discontinuous signal comprised of individual quantum events. Optical detector 25 detects and outputs indications of individual quantum events to a noise counter 30 which records all quantum events during a symbol time frame, while a moving window counter 35 counts pulses within the window frame (FIG. 1). A peak window capture 40, counts the peak number of events within a moving window for the symbol time frame and outputs as signal count, Sc_meas. The measured noise count from noise counter 30, Nc_meas, and signal count, Sc_meas, are input to a Kalman filter 45 which provides a best estimate of the two values, Nc_est and Sc_est, to the Poisson process inference 50 which calculates the threshold value, Th, that minimizes the signal BER and calculates the expected BER of the channel based on Poisson statistics. The output of the moving window counter 35 is compared to the threshold value, Th, with a digital comparison 55 and a detection processor 60 records a signal arrival time when the moving window counter exceeds the threshold value (Th) and a pulse width when the window counter is less than the threshold value. Use of this information allows the receiver to configure the detector to optimize the criteria for detection of the signal arrival time and perform signal decoding.

Finally, the signal decode block 65 identifies the symbol value based on the symbol detection time and uses the expected BER and pulse width to dynamically determine the best encoding method of future data. The width of the signal is used to measure the signal dispersion in transit and dynamically adjust the length of the moving window used to detect the pulse. The jitter is used to determine the optimum pulse repetition rate for the channel. Together, the information is used to optimize the detection configuration of the receiver dynamically. It further provides the receiver and communication link with information on how to configure the forward error correction characteristic of the link to maximize the link operating bandwidth.

The Poisson process inference 50 is based on the following concepts. Regarding the Poisson distribution, the probability of the time between events has an exponential distribution based on a characteristic mean rate, typically denoted as lambda:

$P(t) = \text{Exp}(-\text{lambda}*t)$.

The probability of a fixed number of events in a fixed period of time is based on the mean rate, lambda, and the number of events x:

$P(x, \text{lambda})$.

Figure 3:
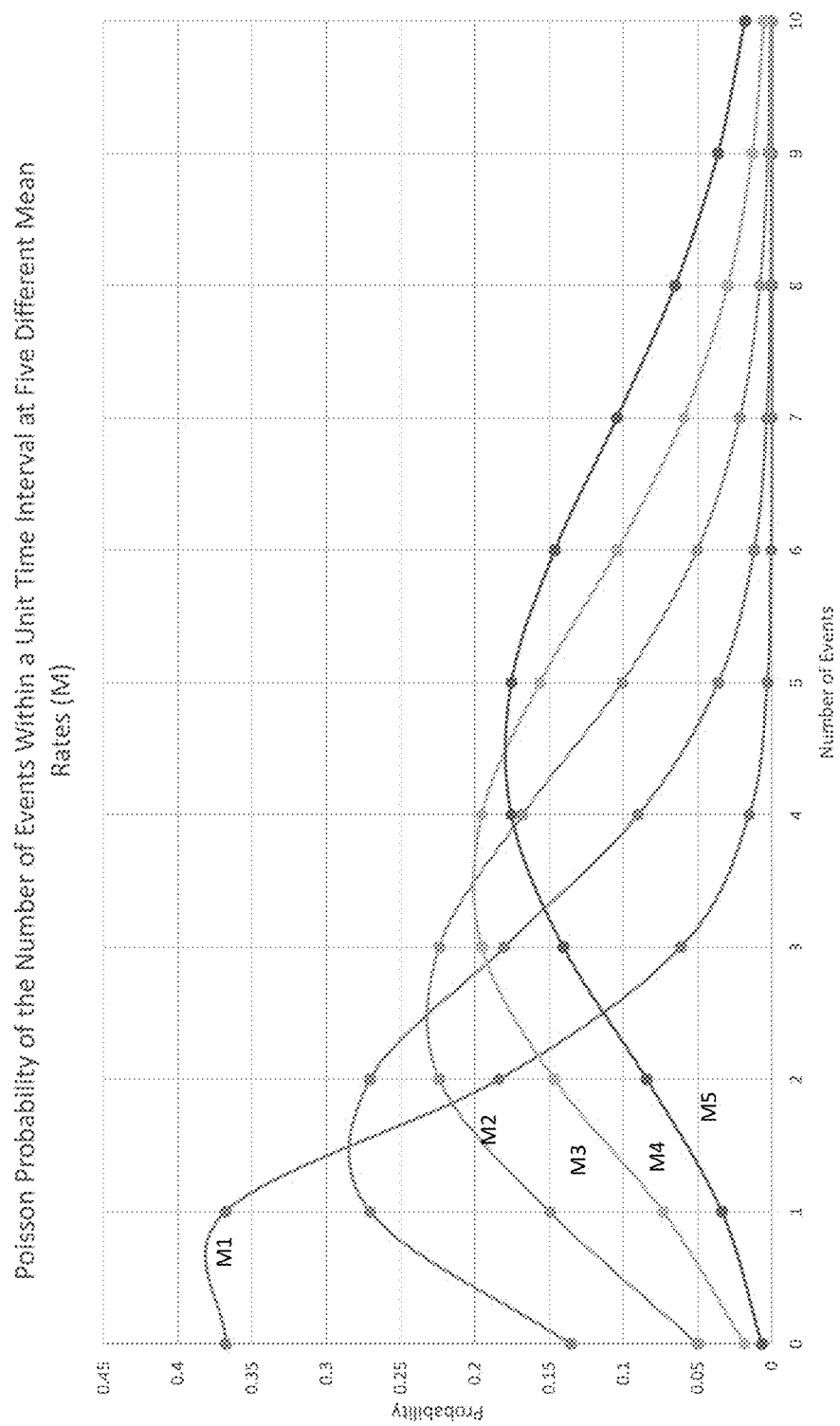
FIG. 3 illustrates Poisson probability of the number of events within a unit time interval at five different mean rates (M)

The plot in FIG. 3 is a typical probability distribution function shown for five values of lambda, i.e., mean rate (M): 1 to 5 and probability is shown for 0 through 10 events. A key takeaway is that a higher mean rate has a higher probability of a higher count in a fixed time interval.

Figure 4:
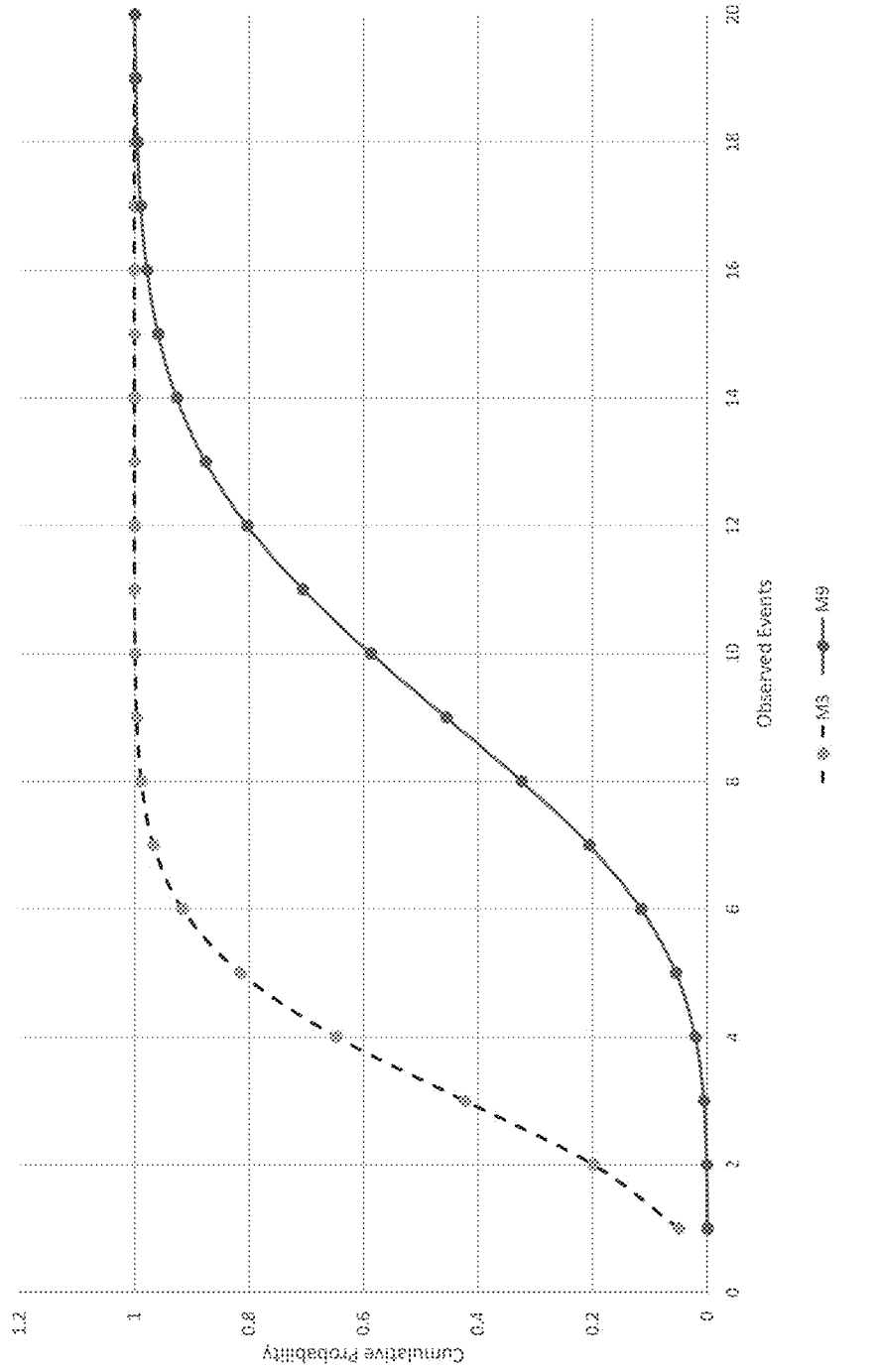
FIG. 4 illustrates probability mass function comparison between a noise rate at M3 and a combine signal and noise rate of M9.

The Poisson probability mass function, also known as the Poisson cumulative probability distribution, allows direct assignment of likelihood for the probability to exceed a count threshold based upon knowledge of the mean rate (M). Referring to FIG. 4, two curves for M3 and M9 are plotted. From the M3 curve, it is shown that it is unlikely for the noise to ever have more than 8 counts. From the M9 curve is shown that it is unlikely to ever have less than 3 counts. Between these points is a detection threshold that would minimize the decision error Probability Mass Function=$PM(x, \text{lambda})$.

Figure 5:
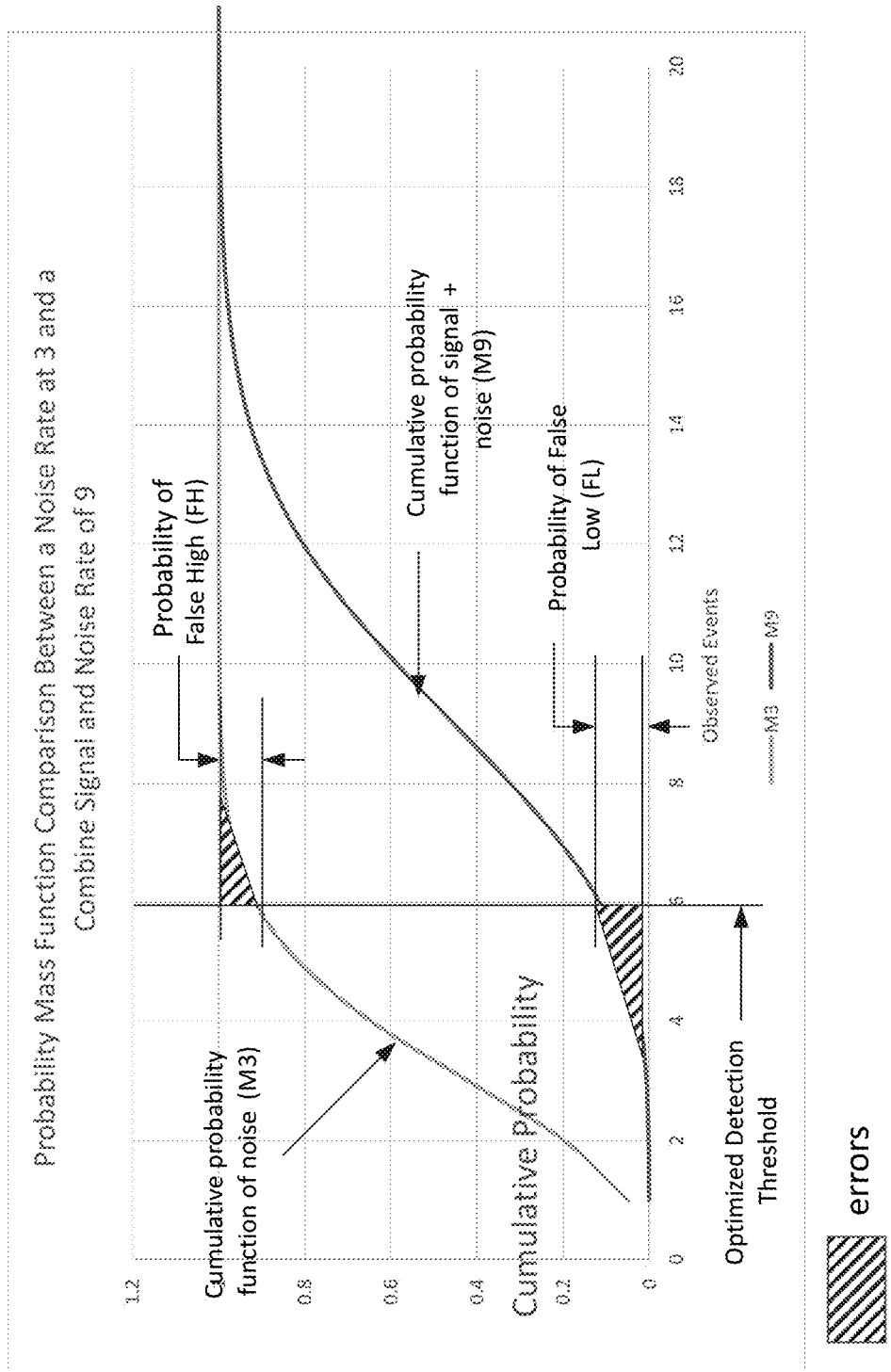
FIG. 5 illustrates the comparison graphs of FIG. 4 with visual indications of probability of false high (FH) and false low (FL) errors.

Referring to FIG. 5, a visual example of the selection of detection threshold is presented. In the example, a comparison between probability mass functions of rate 3 (M3) and rate 9 (M9) is illustrated. The low rate is an example of noise, whereas the higher rate is an example of (signal+noise). The probability of an error is the combined probability of a False High (FH) or a False Low (FL). Errors are as indicated and in this example, the probability of error is significant at 39%. The Poisson distribution provides an analytical model to test the performance of changes in the strength of the noise and the signal and provide a framework for selection of an optimized detection threshold.

Figure 6:
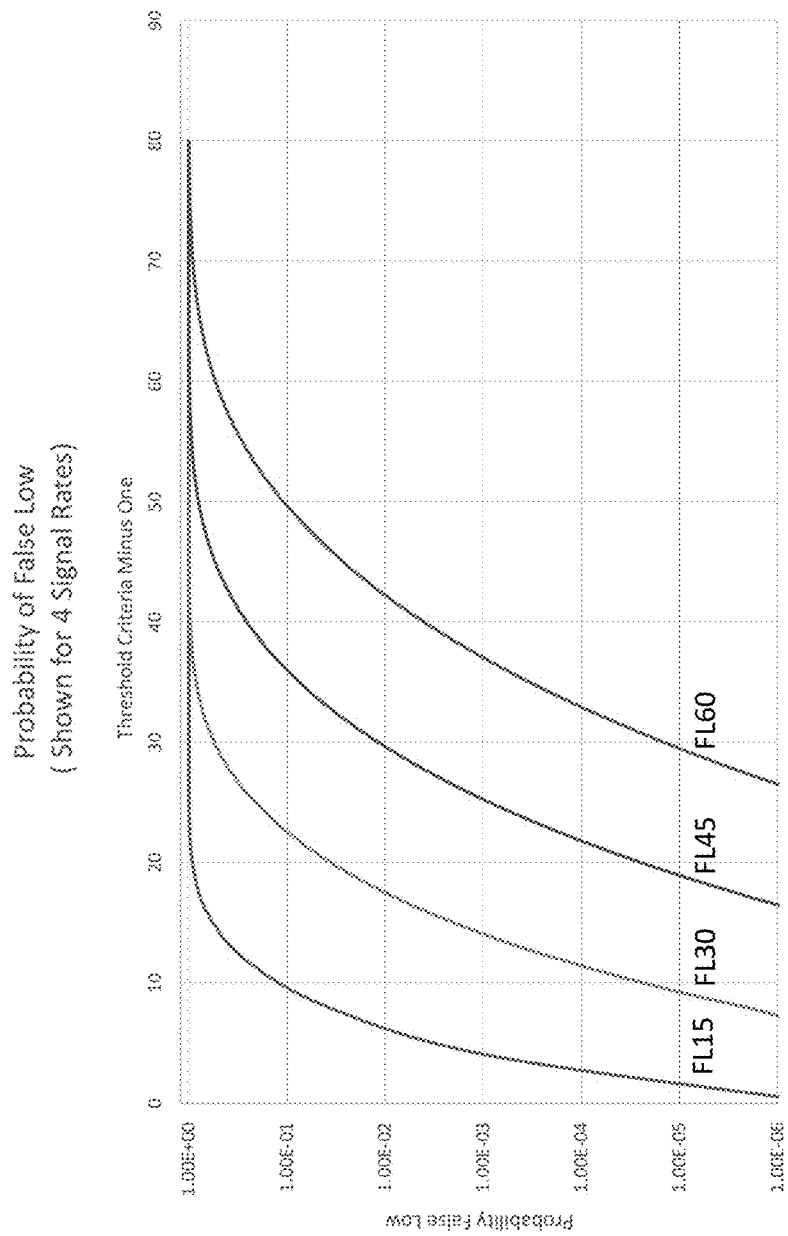
FIG. 6 illustrates probability of false low (FL) for 4 different signal rates.

The probability of false low ("PBFL") is the probability that the signal of interest does not have enough counts to trip the detector and is determined by:

$\text{PBFL} = PM((TH-1), \text{SigLambda})$ wherein SigLambda is the signal event rate TH-1 is the event count, wherein TH is threshold. Examples of PBFL are shown in FIG. 6 for four different signal rates, wherein it is shown that as the threshold value goes low, the probability of false low drops.

The probability of false high ("PBFH") is where the background noise incorrectly exceeds the threshold. The noise event rate=NoiseLambda. This is the inverse probability that the noise is below the threshold or (TH-1) during a single time slot:

single $\text{PBFH}' = PM((TH-1), \text{NoiseLambda})$

Figure 7:
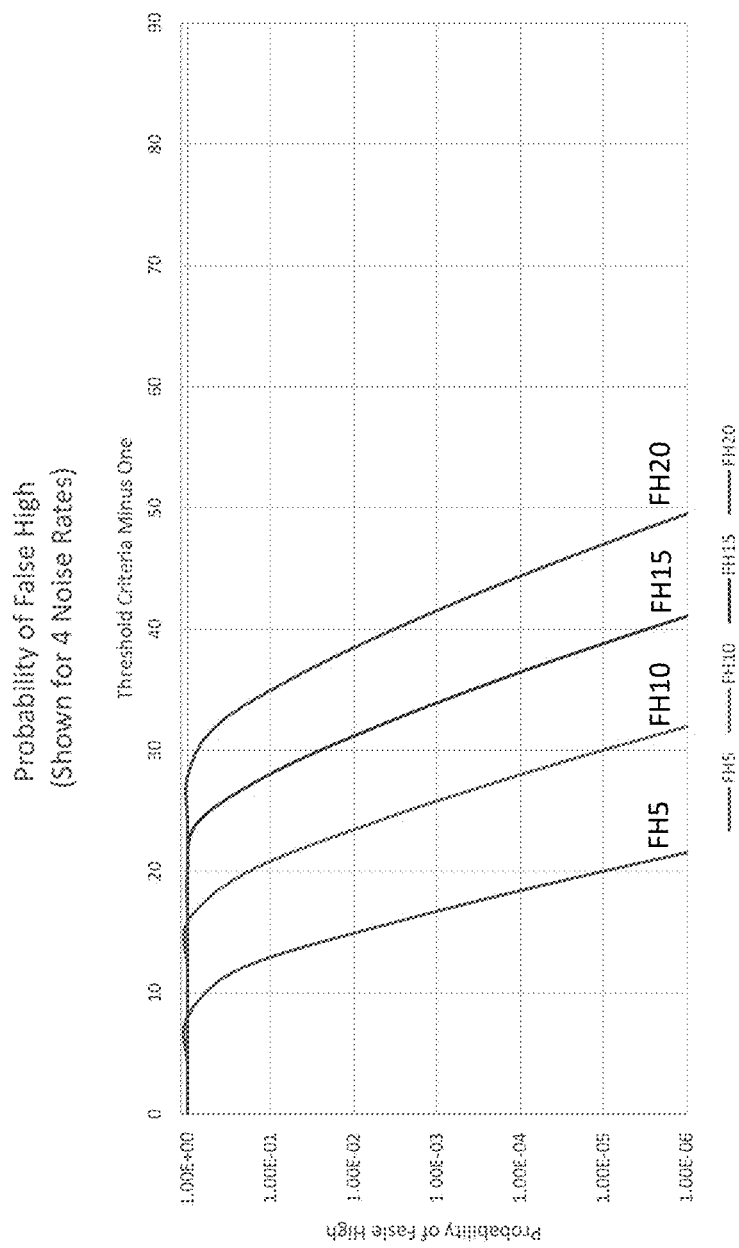
FIG. 7 illustrates probability of false high (FH) for 4 different noise rates.

This instance needs to be false for every time slot in the symbol or there is a false high, so $\text{PBFH}' = PM((TH-1), \text{NoiseLambda})^t$ wherein, Wt is the number of window times per symbol. And the probability that noise is below the threshold is $\text{PBFH} = (1 - (PM((TH-1), \text{NoiseLambda})^{Wt})$ This is a function that decreases as the threshold increases. Examples of PBFH are shown in FIG. 7 for four different signal rates.

The probability of a bit error (BER) is the combined probability of either a PBFH or PBFL or both, which are independent probability functions. The probability of either event is the inverse of the product of the inverse PBFH and inverse PBFL or BER=Inv(InvPBFH*InvPBFL)

BER=1-(1-PBFH)*(1-PBFL)

Figure 8:
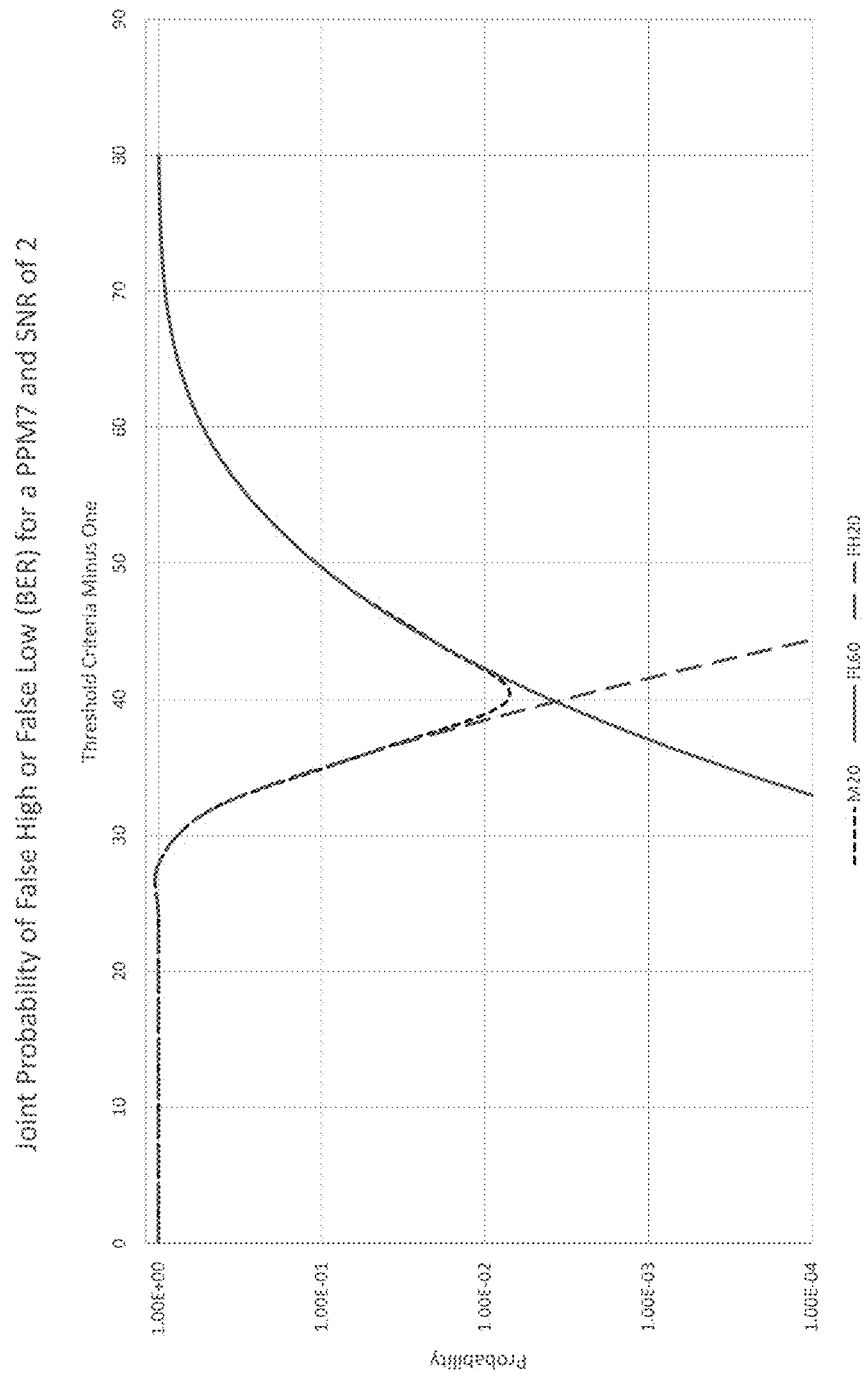
FIG. 8 illustrates joint probability of false high (FH) or false low (BER) for a PPM7 and SNR of 2.

The BER can be minimized by the best selection of a threshold. FIG. 8 shows the combination of PBFL and PBFH and that there is a BER minimum (M20) at an optimum threshold criteria, 40, for a specific instance of noise (FH20) and signal rates (FL60) for a PPM7 and SNR of 2. PPM is pulse position modulation and PPM # refers to the number of bits per symbol, so PPM7 means 7 data bits per symbol and would have 128 time slots per data period.

Figure 9A:
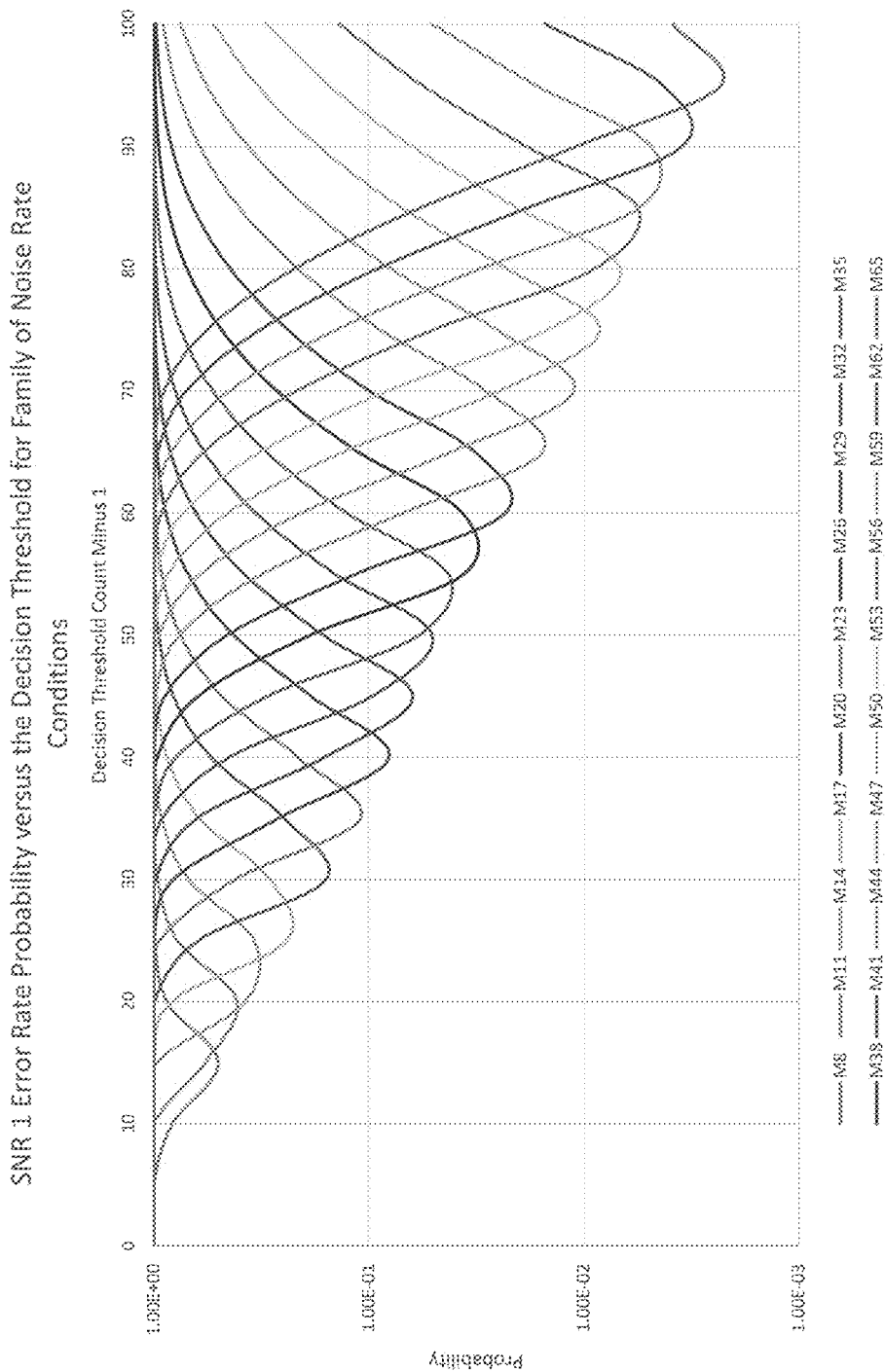
FIG. 9a illustrates SNR 1 error rate probability versus the decision threshold for family of noise rate conditions.
Figure 9B:
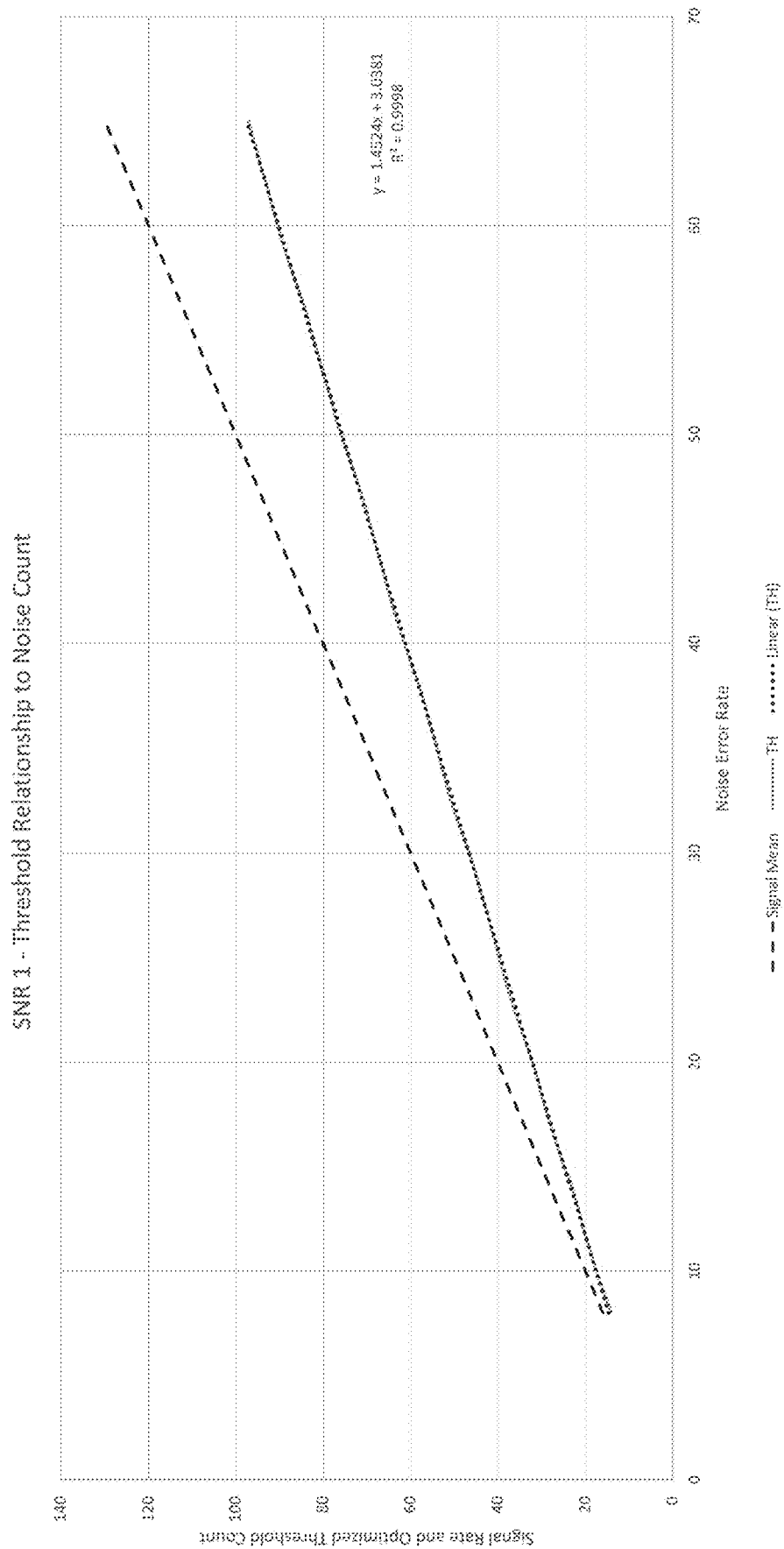
FIG. 9b illustrates threshold relationship to noise count for the SNR 1 example.
Figure 9C:
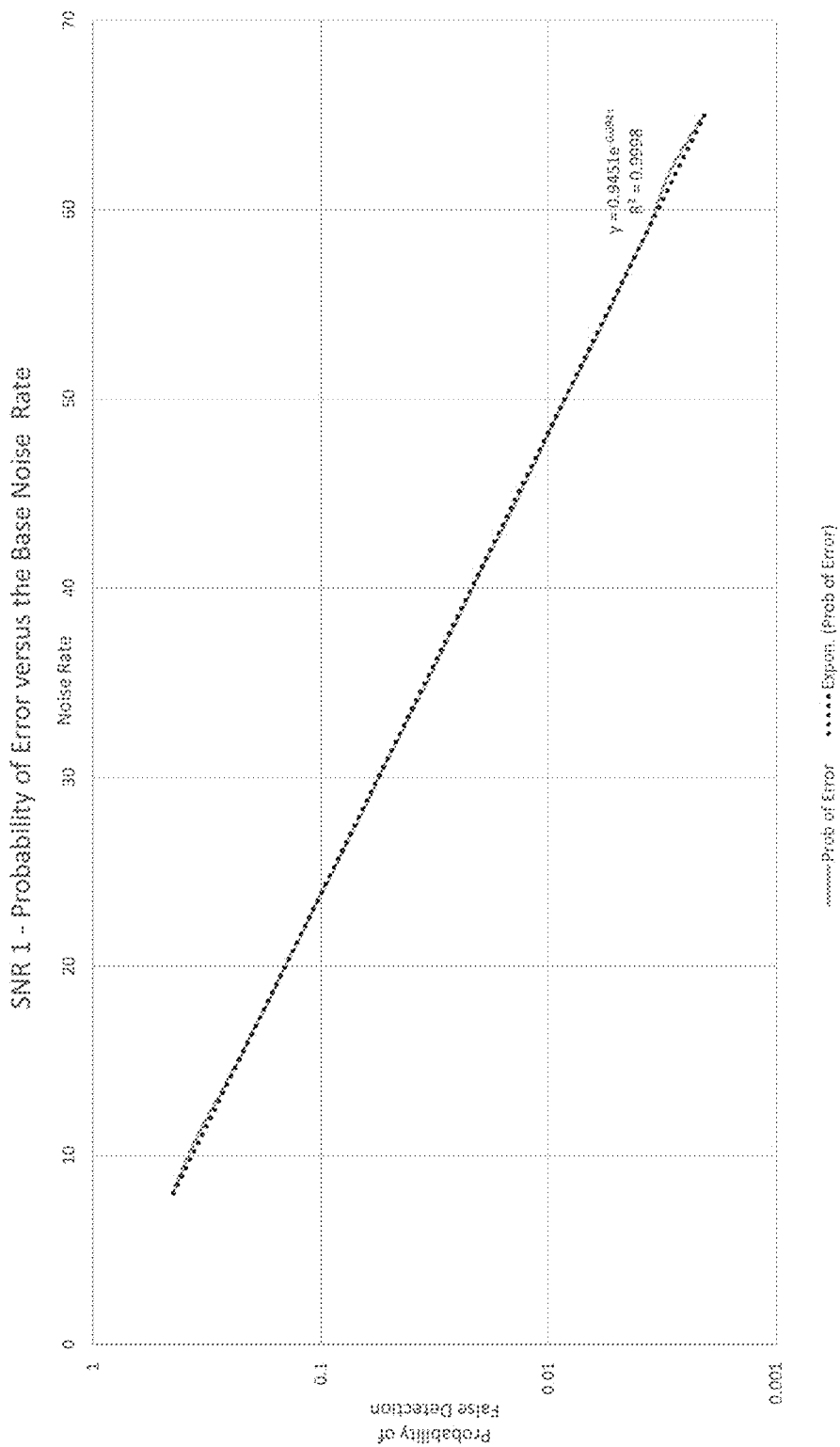
FIG. 9c illustrates probability of error versus the base noise rate for the SNR 1 example.

FIGS. 9a to 9c exemplify a PPM3, SNR of 1, or the Signal Rate+the Noise Rate has 2 times the rate of the just the noise. FIG. 9a shows the SNR 1 error rate probability versus the decision threshold for a family of noise rate conditions. The error rate is minimized by selection of a detection threshold, which is directly related to the noise mean. The error rate declines by strategic selection of the correct detection threshold and where possible, having better decimation of the sample space to see the actual individual PE events and thirdly by an increase in the signal. An important take away is that the noise is not just based on SNR, but combined SNR and absolute signal strength. FIG. 9b shows threshold relationship to noise count for the SNR 1 example and FIG. 9c shows probability of error versus the base noise rate for the SNR 1 example. The optimized threshold count is a linear function of the base noise rate. The error rate continues to decrease for greater precision decimation of the sampling window and with a simple exponential estimate of BER.

Figure 10A:
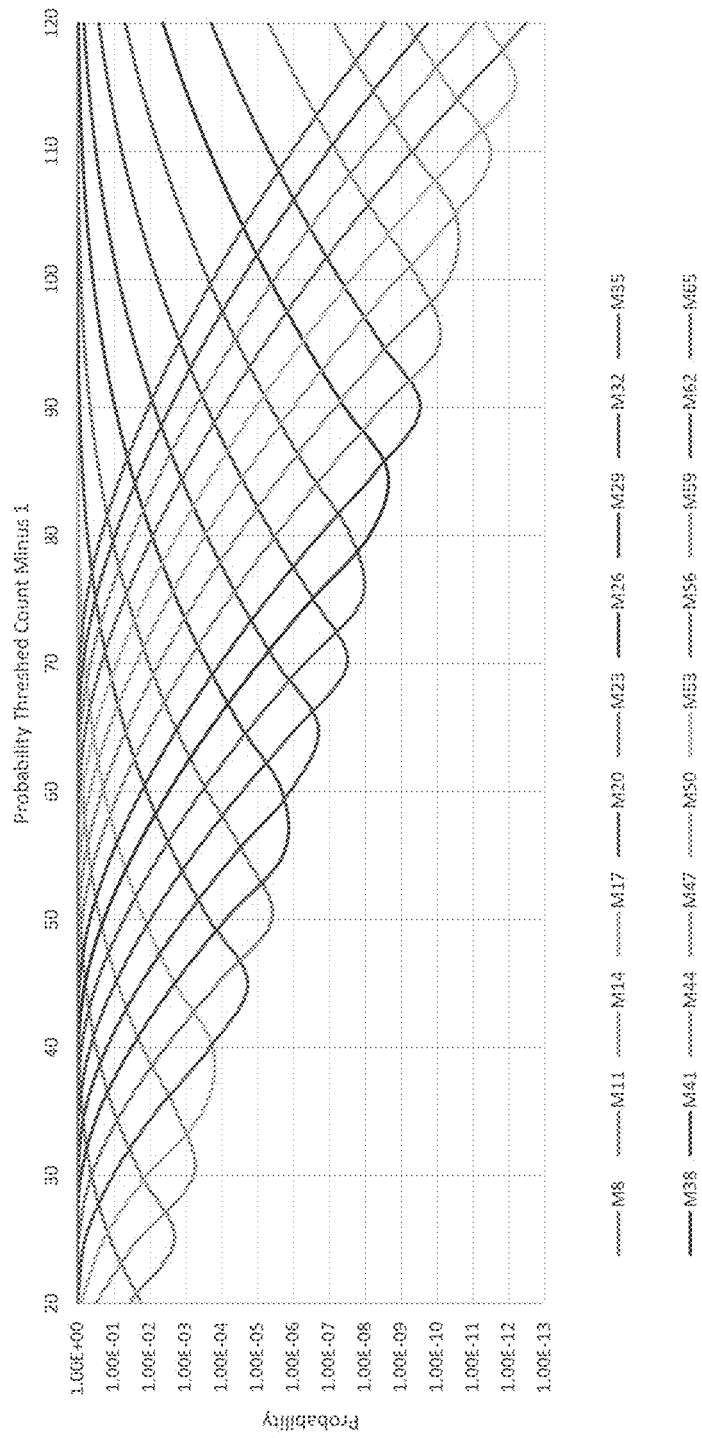
FIG. 10a illustrates SNR 3 error rate probability versus the decision threshold for family of noise rate conditions.
Figure 10B:
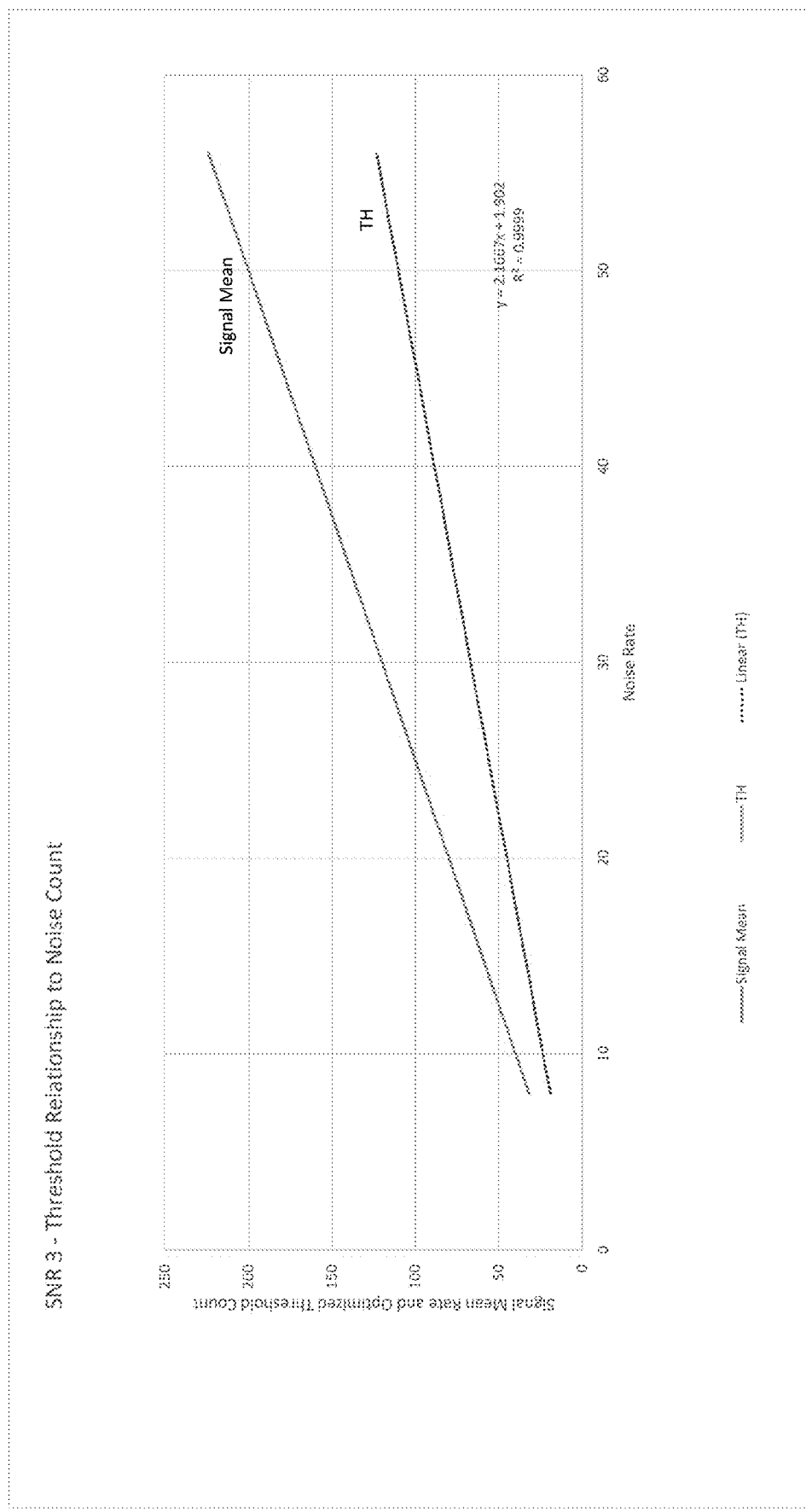
FIG. 10b illustrates threshold relationship to noise count for the SNR 3 example.
Figure 10C:
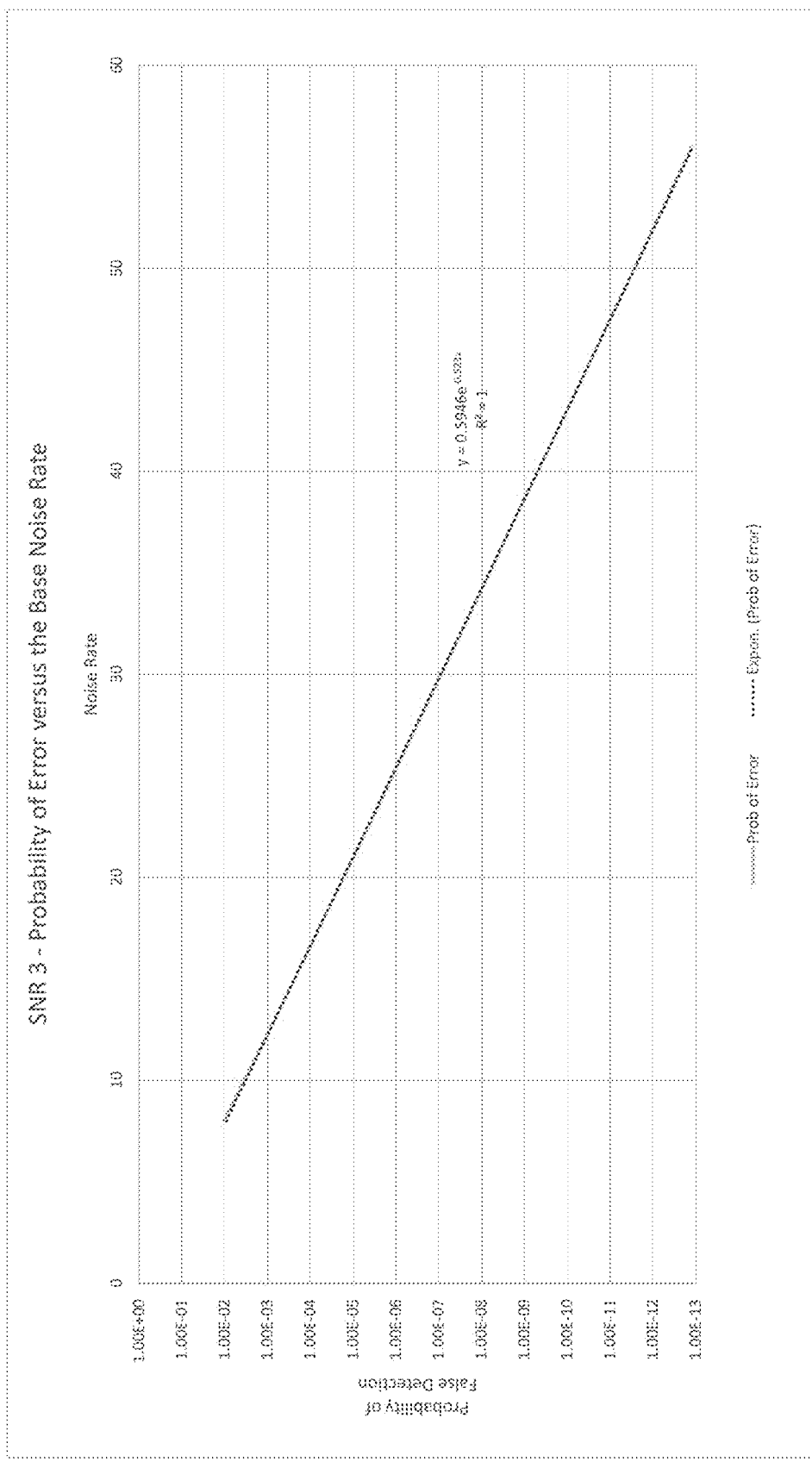
FIG. 10c illustrates probability of error versus the base noise rate for the SNR 3 example.

FIGS. 10a to 10c exemplify a PPM3, SNR of 3, or the Signal Rate+the Noise Rate has 4 times the rate of just the noise. With improved SNR, the probability of error quickly drops as the overall signal amplitude increases. At M17 and signal+noise rate at 68, the error rate is 1E-4.

The basic method of signal detection described herein can be used to completely displace traditional signal detection methods. As the signal energy increases, the same method of counting is used for signal detection. The primary change is that as the signal begins to appear as a semi-continuous event; the length of these events are measured with a fixed clock and results in count statistics that can be used to determine an optimal detection criteria. The basic method described herein also displaces the need to have configurable matched filters applied to the signal detection amplification to adjust for changes in the link dispersion and changes in the link signal to noise ratio. The invention employs the use of configurable window apertures that are used to capture the signal detection count to adjust for these conditions.

The invention can be applied to many areas of pulse detection. This includes use in an optical tracking device that has multiple detectors to sense the alignment of the optical interface to a remote signal source. The quantum detection device can be used to determine the signal strength from each detector; this information is then applied in determination of alignment. The quantum detection supports track indication under the demanding conditions of low signal duty cycle and high background optical noise.

By way of specific example, the embodiments described herein may be incorporated in one or more embodiments described in U.S. patent application Ser. No. 15/450,719 entitled SYSTEM AND METHOD FOR IMPLEMENTING ADAPTIVE PULSE POSITION MODULATION (APPM) FOR IMPROVED OPTICAL COMMUNICATIONS PERFORMANCE which was filed on Mar. 6, 2017, now U.S. Pat. No. 10,256,918, the substance of which is incorporated herein by reference in its entirety.

The invention claimed is:

1. A process for identifying a transmitted signal received at a detector, comprising:
counting all individual quanta events received during a predetermined time frame, wherein the counted individual quanta events (SC) include transmitted signal quanta events and noise quanta events;
counting a number of individual quanta events occurring within each instance of a predetermined window of time, wherein the predetermined time frame includes a predetermined number of predetermined window instances (WPS);
identifying a predetermined window instance having a highest count (PWC) of quanta events within the predetermined time frame; and
calculating a number of transmitted signal quanta events (SIG) to identify the transmitted signal using a relationship between SC, WPS and PWC.

2. The process according to claim 1, wherein the relationship between SC, WPS and PWC comprises:

NR=(SC-PWC)/(WPS-1)

wherein NR is an average rate of quanta events due to noise, and further wherein:

SIG=PWC-NR.

3. The process according to claim 1, wherein the transmitted signal is an optical signal.

4. The process according to claim 3, wherein the transmitted signal arrives at the detector as a discontinuous pulse.

5. The process according to claim 1, wherein the detector is a photomultiplier tube (PMT) detector.

6. The process according to claim 1, further comprising: adjusting at least one operational characteristic of the detector in accordance with calculating a number of transmitted signal quanta events (SIG) to identify the transmitted signal.

7. The process according to claim 6, wherein the at least one operational characteristic is selected from the group consisting of: detector gain and detector alignment.

8. The optical tracking device according to claim 1, wherein the relationship between SC, WPS and PWC comprises:

NR=(SC-PWC)/(WPS-1)

wherein NR is an average rate of quanta events due to noise, and further wherein:

SIG=PWC-NR.

9. A communication system for detection of semi-continuous and discontinuous signals, comprising:
a signal transmitter for transmitting encoded signal pulses;
a signal detector for receiving signals, including the transmitted encoded signal pulses, the signal detector including:
a first counter for counting all individual quanta events received by the signal detector during a predetermined time frame, wherein the counted individual quanta events (SC) include transmitted encoded signal pulse quanta events and noise quanta events;

a second counter for counting a number of individual quanta events occurring within each instance of a predetermined window of time, wherein the predetermined time frame includes a predetermined number of predetermined window instances (WPS); and processor-implemented code for identifying a predetermined window instance having a highest count (PWC) of quanta events within the predetermined time frame and for calculating a number of transmitted encoded signal pulse quanta events (SIG) to identify the transmitted signal pulse using a relationship between SC, WPS and PWC.

10. The communication system according to claim 9, wherein the relationship between SC, WPS and PWC comprises:

NR=(SC−PWC)/(WPS−1)

wherein NR is an average rate of quanta events due to noise, and further wherein:

SIG=PWC−NR.

11. The communication system according to claim 9, wherein the transmitted encoded signal pulses are optical signals.

12. The communication system according to claim 11, wherein the transmitted encoded signal pulses arrive at the detector as a semi-continuous or discontinuous pulse.

13. The communication system according to claim 9, wherein the detector is a photomultiplier tube (PMT) detector.

14. The communication system according to claim 9, further comprising:
processor-implemented code for adjusting at least one operational characteristic of the detector in accordance with calculating a number of transmitted encoded signal quanta events (SIG) to identify the transmitted signal.

15. The communication system according to claim 14, wherein the at least one operational characteristic is selected from the group consisting of: detector gain and detector alignment.

16. The communication system according to claim 9, further including:
processor-implemented code for using (SC) and (SIG) to calculate a threshold quanta event value, Th, that minimizes the received signal's bit error rate (BER); and
processor-implemented code for comparing each predetermined window of time's individual quanta count from the second counter with Th, wherein for counts exceeding Th, an arrival time is recorded, wherein at least BER and arrival time are used to decode the signal pulse.

17. The communication system of claim 16, wherein the processor-implemented code for using (SC) and (SIG) to calculate a threshold quanta event value, Th, that minimizes the received signal's bit error rate (BER) implements Poisson process inference.

18. The communication system of claim 9, further comprising:
a filter for continuously receiving (SC) and (SIG) determinations for multiple received signals and filtering the multiple received (SC) and (SIG) to provide an estimated ($SC_{est}$) and estimated ($SIG_{est}$) to calculate the threshold quanta event value, Th, that minimizes the received signals' bit error rate (BER).

19. The communication system of claim 18, wherein the code for using ($SC_{est}$) and ($SIG_{est}$) to calculate a threshold quanta event value, Th, that minimizes the received signal's bit error rate (BER) implements Poisson process inference.

20. An optical tracking device comprising:
multiple optical detectors receiving transmitted encoded signals from a remote signal transmitter and for sensing alignment of an optical interface to the remote signal transmitter;
a quantum detector for determining a signal strength for the transmitted encoded signals from each of the multiple detectors, the quantum detector including:
a first counter for counting all individual quanta events received by each of the multiple optical detectors during a predetermined time frame, wherein the counted individual quanta events (SC) include transmitted encoded signal pulse quanta events and noise quanta events;
a second counter for counting a number of individual quanta events occurring within each instance of a predetermined window of time, wherein the predetermined time frame includes a predetermined number of predetermined window instances (WPS);
processor-implemented code for identifying a predetermined window instance having a highest count (PWC) of quanta events within the predetermined time frame and for calculating a number of transmitted encoded signal pulse quanta events (SIG) to identify a transmitted signal pulse using a relationship between SC, WPS and PWC and to determine a signal strength of each the received transmitted encoded signals at each of the multiple optical detectors; and
processor-implemented code for adjusting an alignment of the optical interface to the remote signal transmitter in accordance with the determined signal strengths.

* * * * *